United States Patent [19]

Iwasaki

[11] Patent Number: 5,200,766
[45] Date of Patent: Apr. 6, 1993

[54] OPTICAL SCANNING DEVICE USED FOR IMAGE FORMING APPARATUS

[75] Inventor: Takeo Iwasaki, Nagoya, Japan

[73] Assignee: Brother Kogyo Kabushiki Kaisha, Aichi, Japan

[21] Appl. No.: 662,822

[22] Filed: Mar. 1, 1991

[30] Foreign Application Priority Data

Mar. 13, 1990 [JP] Japan .................................. 2-61995

[51] Int. Cl.$^5$ .............................................. H04N 1/21
[52] U.S. Cl. .................................................. 346/108
[58] Field of Search .................. 346/108, 107 R, 160, 346/110 R

[56] References Cited

U.S. PATENT DOCUMENTS 3,270,132  8/1966  Richey ........................... 346/108
3,619,484  11/1971  Tanake et al. .................. 346/108
4,560,989  12/1985  Radochonski et al. ......... 346/110 R
4,999,648  3/1991  Debesis ........................... 346/107 R Primary Examiner—Mark J. Reinhart
Attorney, Agent, or Firm—Oliff & Berridge

[57] ABSTRACT

An optical scanning device comprising a light source for emitting a light beam on the basis of the image information, an optical waveguide array including plural optical waveguides each comprising a core portion formed at the center portion thereof for guiding the light beam from the light source therealong and a cladding portion formed so as to surround the core portion and each having a light incident end for receiving the light beam from the light source and a light emitting end for emitting the light beam guided along the core portion, and a polygonal mirror for successively distributing the light beam having the image information to each of the light incident ends of the optical waveguides in a spot form. The optical waveguides are arranged in such a manner that an interval between centers of neighboring cores is smaller than a spot diameter of the light beam incident to the light incident end of each of the optical waveguides.

27 Claims, 1 Drawing Sheet

OPTICAL SCANNING DEVICE USED FOR IMAGE FORMING APPARATUS

BACKGROUND OF THE INVENTION

This invention relates to an optical scanning device used for an image forming apparatus utilizing an electrophotographic technique such as a laser printer or the like, and more particularly to an optical scanning device using an optical waveguide array.

In Japanese Patent Application No. 1-309220 (not prior art), the same applicant as this application has proposed an optical scanning device for scanning a light beam on a photosensitive drum of an image forming apparatus using an optical waveguide array to form an electrostatic latent image on the photosensitive drum. In this optical scanning device, plural optical waveguides are arcuately arranged at one end of the device and straightly or parallel arranged at the other end. The arcuately arranged end serves as a light incident end for receiving a modulated light beam from a light source, and the straightly arranged end serves as a light emitting end for emitting the modulated light beam passing through the optical waveguides. Each of the optical waveguides comprises two kinds of materials having different refractive indexes to the light beam from the light source. In more detail, as shown in FIG. 1, a core portion 41 having a higher refractive index is formed at the center portion of the optical waveguide, and a cladding portion 42 having a lower refractive index is formed so as to surround the core portion 41. An interval (core pitch) W between the centers of cores of neighboring optical waveguides is set to a distance which is determined by a resolution of the image forming apparatus using the optical scanning device. For example, when the resolution of an output image is 300 DPI (dot number per inch), the core pitch W is set to approximately 85 microns because a dot (pixel) interval of the image is approximately 85 microns.

As described above, in the optical scanning device having the above arrangement of the optical waveguides, the core interval W between the core portions 41 is equal to the dot (pixel) interval. Accordingly, when each of the light beams which are distributed by a light beam distributing means is converged into a spot beam having a diameter below less than a dot (pixel) interval determined by a resolution, and is incident to a light incident end of each optical waveguide of the optical scanning device, those light beams whose lights are incident on the cladding portion 42 do not reach the photosensitive drum, so that an image quality is deteriorated due to lack of those light beams.

SUMMARY OF THE INVENTION

An object of this invention is to provide an optical scanning device having an optical waveguide array including plural optical waveguides in which a core pitch between the optical wave guides is set to be smaller than a spot diameter of a light beam at a light incident end of the optical waveguide array, whereby light beams incident to the optical waveguide array are constantly and homogeneously irradiated to a photosensitive drum and deterioration of image quality is prevented.

In order to attain the above object, an optical scanning device according to this invention comprises a light source for emitting a light beam on the basis of image information, an optical waveguide array including plural optical waveguides each comprising a core portion formed at the center portion thereof for guiding the light beam from the light source therealong and a cladding portion formed so as to surround the core portion and each having a light incident end for receiving the light beam and a light emitting end for emitting the light beam guided along the core portion, and a light beam distributor for successively distributing the light beam having the image information to each of the light incident ends of the optical waveguides in a spot form, wherein the optical waveguides are arranged in such a manner that an interval between the centers of neighboring cores is smaller than a spot diameter of each of the light beams at the light incident end of each of the optical waveguides.

According to the optical scanning device of this invention, the light beam which is modulated on the basis of the image information, is successively distributed to the respective light incident ends of the optical waveguides of the optical waveguide array by the light beam distributor. In this case, the pitch between the neighboring core portions is set to be smaller than the spot diameter of the light beam, and therefore each light beam is constantly incident over plural core and cladding portions. Accordingly, the incident light beams are guided along the respective optical waveguides and then constantly homogeneously irradiated to the photosensitive drum, so that image quality is prevented from being deteriorated due to lack of image information.

DETAILED DESCRIPTION OF THE INVENTION

A preferred embodiment of this invention will be described hereunder with reference to the accompanying drawings.

Figure 1:
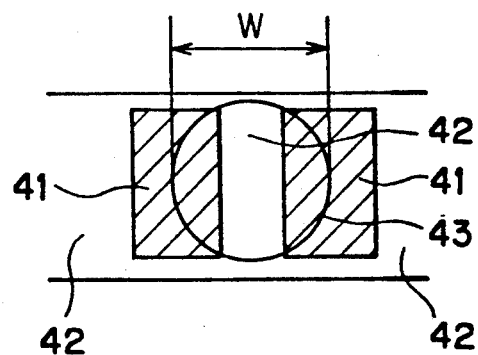
FIG. 1 is an enlarged cross-sectional view of a light incident end of a conventional optical scanning device.
Figure 2:
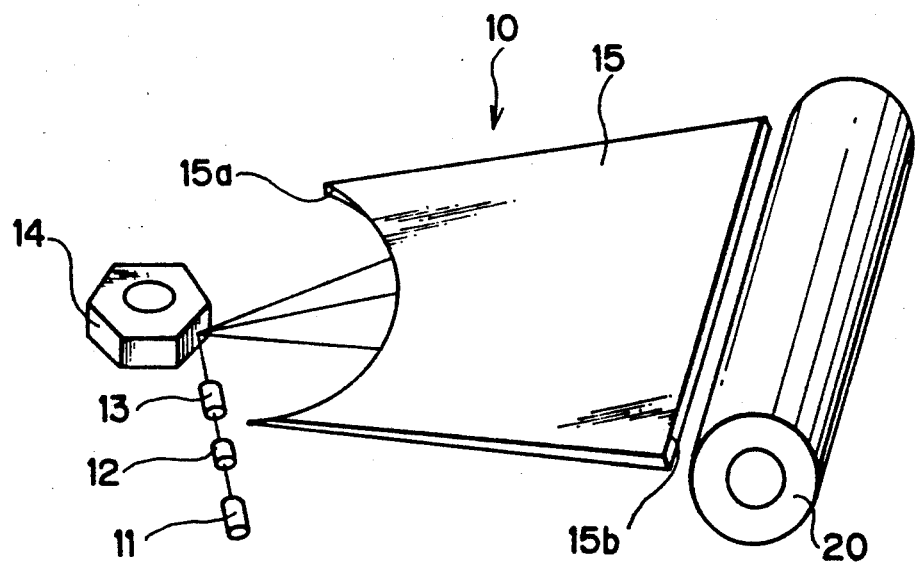
FIG. 2 is a perspective view of one embodiment of an optical scanning device according to this invention.

FIG. 2 is a perspective view of one embodiment of an optical scanning device according to this invention, and FIG. 2 is an enlarged cross-sectional view of a light incident end of an optical waveguide array of the optical scanning device as shown in FIG. 2. The optical scanning device 10 of this embodiment includes a light source 11 for emitting a light beam modulated on the basis of an image information, an optical waveguide array 15 comprising plural optical waveguides each having light incident and emitting ends for receiving the light beam from the light source 11 and guiding the light beam therealong to a photosensitive drum 20, each of the optical waveguides comprising a core portion 21 formed at the center portion of the optical waveguide for guiding the incident light beam therealong and a cladding portion 22 formed so as to surround the core portion 21, and a polygonal mirror 14 for deflecting or distributing the light beam from the light source 11 to a light incident end of each of the optical waveguides.

The light beam is emitted from the light source 11 while the lighting thereof is turned on and off on the basis of an electrical signal representing the image information, and for example, comprises a laser diode (LD), a light emitting diode (LED) and other semiconductor light source.

A collimating lens 12 is provided at the downstream of the light source 11 with respect to a light propagating pass to collimate the light beam from the light source 11. Further downstream of the collimating lens 11 is provided a converging lens 13 for converging the light beam passed through the collimating lens 12 to the optical waveguide array 15.

The polygonal mirror 14 is disposed so as to be rotatable at a high speed by a motor (not shown), and the light beam converged by the converging lens 13 is successively irradiated to each light incident end 15a of the optical waveguides constituting the optical waveguide array 15 through the rotation of the polygonal mirror 14.

The optical waveguide array 15 is formed in such a manner that the light incident ends of the optical waveguides are arcuately arranged so as to surround the polygonal mirror 14 and the light emitting ends 15b of the optical waveguides are linearly arranged in parallel to a shaft axis of the photosensitive drum 20.

Figure 3:
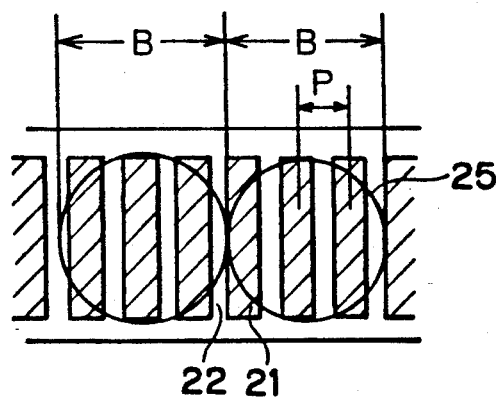
FIG. 3 is an enlarged cross-sectional view of a light incident end of the optical scanning device as shown in FIG. 2.

As shown in FIG. 3, in this embodiment, a core pitch P which is defined as a distance between the centers of neighboring cores is set to be smaller than a spot diameter B of the light beam 25 incident to the light incident end of the optical waveguide array 15, and the spot diameter B is set to be substantially equal to a distance between pixels which is determined by the image resolution. Particularly, the core pitch P is preferably set to a value smaller than half (50%) of the spot diamter B in length, and more preferably set to a value substantially equal to 35% of spot diameter B in length. For exampole, in a optical scanning device having an image resolution of 300 DPI, the distance between the pixels is set to 85 microns, and thus the spot diameter B is set to 85 microns. On the other hand, the core pitch P is set to be a value smaller than 85 microns, for example, 30 microns.

An scanning operation of the optical scanning device thus constructed will be described hereunder.

The light beam is emitted from the light source 11 while lighting on the basis of an image information, and the is passed through the collimating lens 12 and the converging lens 13 to the polygon mirror 14. The polygon mirror 14 successively assigns the light beam to each of the optical waveguides of the optical waveguide array 15. As described above, the core pitch P is set to be smaller than the spot diameter B of the laser beam, the laser beam is constantly irradiated to plural core portions 21 and plural cladding portions 22, and then is guided through the core portions 21 while totally reflected between interface between the core and cladding portions 21 and 22 due to difference in refractive index therebetween. The light beam incident to the cladding portions 22 is attenuated therein.

As described above, since the core pitch P (30 microns) is set to be remarkably smaller than the spot diameter B (85 microns) of the light beam, the incident light beam is constantly irradiated to plural clad portions 21 and plural cladding portions 22 as shown in FIG. 3, and at least part of the incident beam spot which corresponds to a pixel is constantly guided along the optical waveguide array 15 and emitted from the light emitting end of the optical waveguide array 15 to the photosensitive drum 20. In this case, even if the beam spot is moved along the arrangement of the optical waveguides (horizontally in FIG. 2) during propagation of the incident light beam from the light incident end 15a of the optical waveguide array 15 to the light emitting end 15b thereof, the amount of the incident light to be emitted from the light emitting end 15b is not changed, and thus no deterioration in image quality occurs.

Through the above operation, the light beam whose lighting is turned on and off on the basis of the image information in the light source 11 is scanned in the direction parallel to the shaft axis of the photosensitive drum 20 at a constant speed to thereby perform a recording operation of an image. The photosensitive drum 20 is rotated by a predetermined angle by a driving means (not shown) every time one main scanning operation of the light beam is completed. This operation is repeated until the whole image is recorded on the photosensitive drum 20.

This invention is not limited to the above embodiment, and any modification may be made to the above embodiments.

According to the optical scanning device of this invention, the light beam which is modulated on the basis of the image information, is successively distributed to the respective light incident ends of the optical waveguides of the optical waveguide array by the light beam distributor. In this case, the pitch between the neighboring core portions is set to be smaller than the spot diameter of the light beam, and therefore each of the light beam is constantly incident over plural core and cladding portions. Accordingly, the incident light beams are guided along the respective optical waveguides and then constantly homogeneously irradiated to the photosensitive drum, so that image quality is prevented from being deteriorated due to lack of image information.

What is claimed is:

1. An optical scanning device for optically scanning a light beam in a scanning direction on a photosensitive medium on the basis of an image information to form an image corresponding to the image information on the photosensitive medium, the optical scanning device comprising: corresponding to the image information on the photosensitive medium, the optical scanning device comprising:
   a) a light source for receiving the image information and for selectively emitting light beams, each light beam having a spot form with a spot diameter on the basis of the image information;
   b) an optical waveguide array including plural optical waveguides, each of said plural optical waveguides comprising:
      i) a core portion formed at the center portion thereof for guiding the light beam from said light source therealong,
      ii) a cladding portion formed so as to surround said core portion,
      iii) a light incident end for receiving the light beam from said light source, and
      iv) a light emitting end for emitting the light beam guided along said core portion; and
   c) a light beam distributor for receiving the light beams from said light source and for successively distributing the light beams to the light incident ends of said plural optical waveguides to thereby successively irradiate the light incident ends with the light beams, wherein said plural optical waveguides are arranged in the scanning direction in such a manner that an interval in the scanning direction between centers of neighboring core portions is smaller than the spot diameter of the light beam spot incident to the light incident ends of the plural optical waveguides so that said optical waveguide array may introduce the light beams incident therein constantly and homogeneously onto the photosensitive medium.

2. An optical scanning device as claimed in claim 1, wherein the respective optical waveguides are arranged in such a manner that the interval in the scanning direction between centers of neighboring core portions at the light incident ends is smaller than the spot diameter of the light beam spot incident to the light incident ends so that each light beam spot may be incident on a plurality of core portions.

3. An optical scanning device as claimed in claim 2, wherein said light beam distributor comprises a rotatable polygonal mirror for reflecting the light beam to scan the light beam in the scanning direction.

4. An optical scanning device as claimed in claim 2, wherein said light source comprises a semiconductor laser.

5. An optical scanning device as claimed in claim 4, wherein said semiconductor laser comprises a laser diode.

6. An optical scanning device as claimed in claim 2, wherein the light incident ends of said optical waveguides are arcuately arranged so as to surround said light beam distributor, and the light emitting ends of said optical waveguides are straightly arranged so as to confront said photosensitive medium.

7. An optical scanning device as claimed in claim 2, wherein said optical waveguides are arranged so that the interval is smaller than half of the spot diameter of the light beam.

8. An optical scanning device as claimed in claim 7, wherein said optical waveguides are arranged so that the interval is substantially equal to about 35% of the spot diameter.

9. An optical scanning device as claimed in claim 2, wherein said optical waveguides are arranged so that the interval is about 30 microns while the spot diameter is about 85 microns.

10. An optical scanning device as claimed in claim 4, wherein said semiconductor laser comprises a light emitting diode.

11. An optical scanning device for optically scanning a light beam in a first direction on a photosensitive medium on the basis of image information to form a desired image corresponding to the image information on the photosensitive medium, the optical scanning device comprising:
   an optical waveguide array including plural optical waveguides, each of said plural optical waveguides comprising a light incident end for receiving a light beam spot, a core portion formed at the center portion thereof for guiding therealong the light beam received at the light incident end, a cladding portion formed so as to surround said core portion, and a light emitting end for emitting the light beam guided along the core portion onto the photosensitive medium, the plural optical waveguides being arranged such that the light incident ends of the respective optical waveguides are arranged along a second direction and the light emitting ends of the respective optical waveguides are arranged along the first direction;
   a light beam irradiating means for receiving the image information and for selectively irradiating the light incident ends of the optical waveguides with light beam spots, each light beam spot having a spot diameter on the basis of the image information; and
   wherein said optical waveguides are arranged in such a manner that the light incident ends of the optical waveguides are arranged in the second direction with an interval between centers of core portions of each two adjacent optical waveguides at their light incident ends being smaller than the spot diameter of the light beam spot incident to the light incident ends of the optical waveguides such that the light beam spot incident on said optical waveguide array may be constantly and homogeneously irradiation onto the photosensitive medium.

12. An optical scanning device as claimed in claim 11, wherein the light incident ends of the optical waveguides are arranged so that each light beam spot may be incident on the core portions of a plurality of the optical waveguides.

13. An optical scanning device as claimed in claim 12, wherein the light incident ends of the optical waveguides are arranged so that the interval is smaller than half of the spot diameter of the light beam.

14. An optical scanning device as claimed in claim 13, wherein the light incident ends of the optical waveguides are arranged so that the interval is substantially equal to about 35% of the spot diameter of the light beam.

15. An optical scanning device as claimed in claim 14, wherein the light incident ends of the optical waveguides are arranged so that the interval is about 30 microns while the spot diameter is about 85 microns.

16. An optical scanning device as claimed in claim 12, wherein said light beam irradiating means includes:
   light source means for receiving the image information and for successively emitting the light beam spots in accordance with the image information; and
   a light beam distributor for successively distributing the light beam spots emitted from the light source means to the light incident ends of the optical waveguides.

17. An optical scanning device as claimed in claim 16, wherein the light source means includes:
   a light source for receiving the image information and for successively selectively emitting light beams, each light beam having a beam diameter in accordance with the image information; and
   a lens unit for converting the light beams into the light beam spots, each light beam spot having the spot diameter to thereby irradiate the incident ends of the optical waveguides.

18. An optical scanning device as claimed in claim 17, wherein said light beam distributor comprises a rotatable polygonal mirror for reflecting the light beam spots to scan the light beam spots along the second direction.

19. An optical scanning device as claimed in claim 18, wherein the light incident ends of said optical waveguides are arranged in the second direction which extends accurately so as to surround the polygonal mirror, and the light emitting ends of said optical waveguides are arranged in the first direction which extends straightly so as to confront the photosensitive medium.

20. An optical scanning device for optically scanning a light beam in a first direction on a photosensitive medium on the basis of image information to form a desired image corresponding to the image information on the photosensitive medium, the optical scanning device comprising:

an optical waveguide array including a light incident end for receiving a light beam spot, a plurality of optical waveguides for guiding therealong the light beam spot received at the light incident end, and a light emitting end for emitting the light beam spot guided along the plurality of waveguides onto the photosensitive medium, the plurality of optical waveguides being arranged at the light incident end along a second direction and being arranged at the light emitting end along the first direction;

a light beam irradiating means for receiving the image information and for selectively irradiating the light incident end of said optical waveguide array with light beam spots on the basis of the image information, each of the light beam spots irradiated on the light incident end having a spot diameter; and wherein an interval between centers of each two adjacent optical waveguides arranged at the light incident end along the second direction is smaller than the spot diameter of the light beam spot.

21. An optical scanning device as claimed in claim 20, wherein the optical waveguides are arranged at the light incident end so that each light beam spot may be incident on a plurality of said optical waveguides.

22. An optical scanning device as claimed in claim 21, wherein the optical waveguides are arranged so that the interval is smaller than half of the spot diameter of the light beam spot.

23. An optical scanning device as claimed in claim 22, wherein the optical waveguides are arranged so that the interval is substantially equal to about 35% of the spot diameter of the light beam.

24. An optical scanning device as claimed in claim 22, wherein said light beam irradiating means includes:

light source means for receiving the image information and for successively selectively emitting the light beam spots in accordance with the image information; and light beam spot scanning means for scanning the light beam spots emitted from the light source means in the second direction, to thereby successively introduce the light beam spots to the optical waveguides at the incident end of the optical waveguide array.

25. An optical scanning device as claimed in claim 24, wherein the light source means includes:

a light source for receiving the image information and for successively selectively emitting light beams, each light beam having a beam diameter in accordance with the image information; and a lens unit for converting the light beams into the light beam spots, each light beam spot having the spot diameter and radiating the light beam spots onto the incident end.

26. An optical scanning device as claimed in claim 25, wherein the light beam spot scanning means includes a rotatable polygonal mirror for reflecting the light beam spots to scan the light beam spots in the second direction.

27. An optical scanning device as claimed in claim 26, further comprising conveying means for conveying a surface of the photosensitive medium in a direction perpendicular to the first direction.

* * * * *